(12) United States Patent
Inagaki et al.

(10) Patent No.: US 10,507,581 B2
(45) Date of Patent: Dec. 17, 2019

(54) ROBOT SYSTEM

(71) Applicant: FANUC CORPORATION, Minamitsuru-gun, Yamanashi (JP)

(72) Inventors: Satoshi Inagaki, Yamanashi (JP); Wenjie Chen, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/054,180

(22) Filed: Aug. 3, 2018

(65) Prior Publication Data

US 2019/0061149 A1 Feb. 28, 2019

(30) Foreign Application Priority Data

Aug. 29, 2017 (JP) .................... 2017-164063

(51) Int. Cl.
*B25J 13/00* (2006.01)
*B25J 9/16* (2006.01)
(Continued)

(52) U.S. Cl.
CPC ............ *B25J 9/163* (2013.01); *B25J 11/005* (2013.01); *B25J 13/088* (2013.01); *B25J 19/02* (2013.01);
(Continued)

(58) Field of Classification Search
CPC . B25J 9/163; B25J 11/005; B25J 19/02; B25J 13/088; Y20S 901/03; Y20S 901/08;
(Continued)

(56) References Cited

U.S. PATENT DOCUMENTS 6,522,949 B1 * 2/2003 Ikeda .................... G05B 19/425
219/121.63
7,405,525 B2 * 7/2008 Hoppe .................... G05B 19/19
318/135
(Continued)

FOREIGN PATENT DOCUMENTS

JP 9-319420 12/1997
JP 2011-167817 9/2011
(Continued)

*Primary Examiner* — Dalena Tran
(74) *Attorney, Agent, or Firm* — Wenderoth, Lind & Ponack, L.L.P.

(57) ABSTRACT

A robot system includes: at least one non-learned robot that has not learned a learning compensation amount of position control based on an operation command; at least one learned robot that has learned the learning compensation amount of the position control based on the operation command; and a storage device that stores the operation command and the learning compensation amount of the learned robot, the non-learned robot comprising a compensation amount estimation unit that compensates the learning compensation amount of the learned robot stored in the storage device based on a difference between the operation command of the learned robot stored in the storage device and an operation command of an own robot, and estimates the compensated learning compensation amount as a learning compensation amount of the own robot.

9 Claims, 7 Drawing Sheets

(51) Int. Cl.
*B25J 11/00* (2006.01)
*B25J 19/02* (2006.01)
*B25J 13/08* (2006.01)

(52) U.S. Cl.
CPC ............. *G05B 2219/39295* (2013.01); *G05B 2219/39298* (2013.01)

(58) Field of Classification Search
CPC .......... G05B 2219/39298; G05B 2219/39295; G06N 20/00; G06N 3/08
USPC ............................. 700/245, 248, 250; 901/3
See application file for complete search history.

(56) References Cited

U.S. PATENT DOCUMENTS

| | | | | |
|---|---|---|---|---|
| 8,170,719 B2 * | 5/2012 | Tsusaka | ................. | B25J 9/1633 700/257 |
| 2009/0125146 A1 * | 5/2009 | Zhang | ................... | B25J 9/1664 700/253 |

FOREIGN PATENT DOCUMENTS

| | | |
|---|---|---|
| JP | 2012-240142 | 12/2012 |
| JP | 2014-14897 | 1/2014 |

* cited by examiner

ROBOT SYSTEM

This application is based on and claims the benefit of priority from Japanese Patent Application No. 2017-164063, filed on 29 Aug. 2017, the content of which is incorporated herein by reference.

BACKGROUND OF THE INVENTION

Field of the Invention

The present invention relates to a robot system including a plurality of robots that perform learning control of calculating a learning compensation amount for compensating position control of a robot mechanism unit.

Related Art

For example, an industrial robot is known, the robot controlling a position of an arm tip end portion (a target portion of position control) of a robot mechanism unit, to perform laser cutting, sealing, arc welding, or the like. With such a robot, operation speed is increased so that a takt time can be reduced and production efficiency can be improved. However, when operation speed of the robot is increased, due to a reducer or insufficiency of rigidity of an arm of the robot mechanism unit, or the like, vibration is sometimes generated in the arm tip end portion of the robot mechanism unit. Thereby, quality of a workpiece is sometimes deteriorated.

Patent Documents 1 and 2 disclose robots that solve such a problem. These robots include a sensor in an arm tip end portion of a robot mechanism unit, and measure by sensor, vibration of the arm tip end portion of the robot mechanism unit during operation of the robot mechanism unit based on an operation program. The robots repeatedly perform learning control of calculating a learning compensation amount with which the measured vibration is reduced. The robots use the learning compensation amount to perform compensation of position control of an arm tip end portion (target portion of position control) of the robot mechanism unit, to reduce the vibration in the arm tip end portion of the robot mechanism unit.

Patent Document 1: Japanese Unexamined Patent Application, Publication No. 2011-167817
Patent Document 2: Japanese Unexamined Patent Application, Publication No. 2012-240142

SUMMARY OF THE INVENTION

A vibration characteristic of an arm tip end portion of a robot mechanism unit significantly varies depending on posture of the robot mechanism unit. Thus, when learning control is performed, a large robust characteristic is necessary, and the number of repetition times of learning increases. When an operation program is modified, learning needs to be performed from the start again, and a large burden is required.

An object of the present invention is to provide a robot system that reduces the number of learning times of calculating a learning compensation amount for compensating position control of a robot mechanism unit.

(1) A robot system (for example, a robot system 1 described later) according to the present invention includes: at least one non-learned robot (for example, a robot 102 described later) that has not learned a learning compensation amount of position control based on an operation command; at least one learned robot (for example, a robot 103 described later) that has learned the learning compensation amount of the position control based on the operation command; and a storage device (for example, a storage device 210 described later) that stores the operation command and the learning compensation amount of the learned robot, the non-learned robot including a compensation amount estimation unit (for example, a compensation amount estimation unit 33 described later) that compensates the learning compensation amount of the learned robot stored in the storage device based on a difference between the operation command of the learned robot stored in the storage device and an operation command of an own robot, and estimates the compensated learning compensation amount as a learning compensation amount of the own robot.

(2) In the robot system according to (1), the compensation amount estimation unit may compensate the learning compensation amount of the learned robot based on a ratio of degrees and a ratio of time lengths between the operation command of the learned robot and the operation command of the own robot.

(3) In the robot system according to (2), the compensation amount estimation unit may scale the operation command and the learning compensation amount of the learned robot and the operation command of the own robot into the same time length, compensate the degree of the learning compensation amount of the learned robot that has been scaled, based on a ratio of degrees of the operation command of the learned robot that has been scaled and the operation command of the own robot that has been scaled, and scale the learning compensation amount of the learned robot that has been compensated into a time length of the operation command of the own robot, thereby compensating the learning compensation amount of the learned robot.

(4) In the robot system according to (1), the compensation amount estimation unit may compensate the learning compensation amount of the learned robot based on a function from the operation command of the learned robot to the operation command of the own robot.

(5) In the robot system according to (4), the compensation amount estimation unit may determine a transfer function from the operation command of the learned robot to the operation command of the own robot, and compensate the learning compensation amount of the learned robot by applying the determined transfer function to the learning compensation amount of the learned robot.

(6) In the robot system according to any of (1) to (5), the non-learned robot may further include a comparison unit (for example, a comparison unit 35 described later) that compares the operation command of the learned robot stored in the storage device and the operation command of the own robot, and the compensation amount estimation unit may compensate the learning compensation amount of the learned robot when correlation of the operation command of the learned robot and the operation command of the own robot is a threshold or more as a result of comparison by the comparison unit, and estimate the learning amount that has been compensated, to be the learning compensation amount of the own robot.

(7) In the robot system according to (6), the comparison unit may scale the operation command of the learned robot and the operation command of the own robot into the same time length, and compare the operation command of the learned robot that has been scaled, and the operation command of the own robot that has been scaled.

(8) In the robot system according to (6) or (7), the compensation amount estimation unit may estimate the learning compensation amount of the learned robot as it is as the learning compensation amount of the own robot, when the operation command of the learned robot and the operation command of the own robot are the same as a result of comparison by the comparison unit.

(9) In the robot system according to any of (1) to (8), the robot system may further include a server device (for example, a server device 200 described later) connected to the non-learned robot and the learned robot via a network, and including the storage device.

According to the present invention, a robot system that reduces the number of learning times of calculating a learning compensation amount for compensating position control of a robot mechanism unit, can be provided.

DETAILED DESCRIPTION OF THE INVENTION

Figure 1:
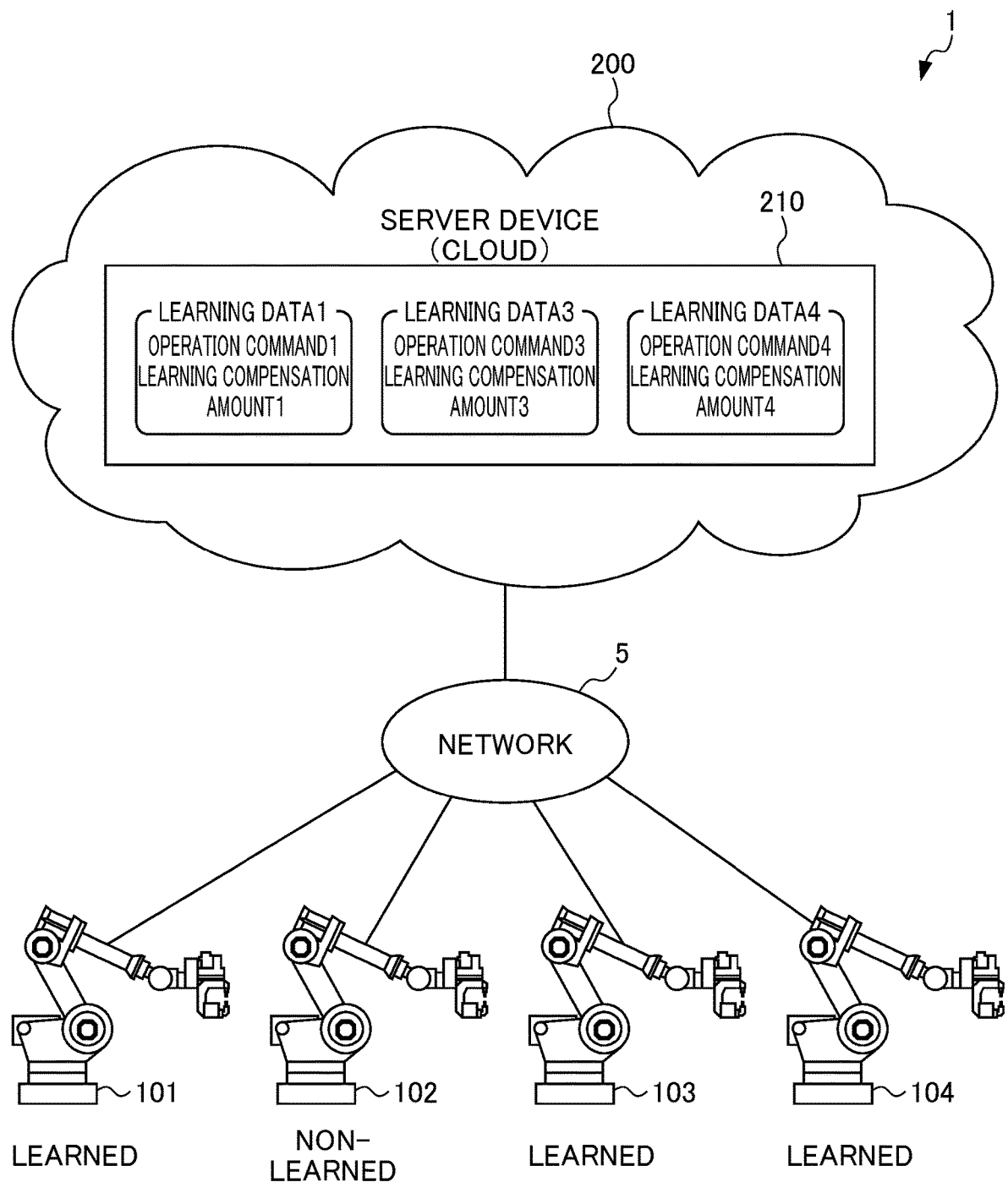
FIG. 1 is a diagram illustrating a configuration of a robot system according to an embodiment.

An example embodiment of the present invention will be described below with reference to attached drawings. Note that the same portion or corresponding portions are denoted with the same reference numeral in each drawing.

First Embodiment

FIG. 1 is a diagram illustrating a configuration of a robot system according to the present embodiment. A robot system 1 shown in FIG. 1 includes four robots 101, 102, 103, 104, and a server device 200 connected to these robots 101, 102, 103, 104 via a network 5.

The robots 101, 102, 103, 104 are, for example, industrial robots that perform laser cutting, sealing, arc welding, or the like. Hereinafter, the robot 102 will be described as representation of the robots 101, 102, 103, 104. However, the robots 101, 103, 104 are similar to the robot 102.

The robot 102 performs position control of a tool tip end portion (target portion of position control) of a robot mechanism unit based on an operation command (operation program). The robot 102 performs compensation of the position control of the tool tip end portion of the robot mechanism unit, for example, in an initial setting. The robot 102 has two functions of a function of conventional learning control, and a function of novel learning control, as functions for generating the compensation amount for this compensation. With the function of conventional learning control, the robot 102 independently performs learning control of repeating operation of the robot mechanism unit based on the operation command by applying the learning compensation amount that has been generated in a previous time, to perform learning of calculating the learning compensation amount with which vibration of the tool tip end portion is reduced (for example, Patent Documents 1 and 2). With the function of novel learning control, the robot 102 utilizes learning data (the operation command and the learning compensation amount) of the learned robot, stored in the server device 200, to estimate the learning compensation amount with which the vibration of the tool tip end portion is reduced. Details of the robot 102 will be described later.

In the present embodiment, the robot 102 has not learned the learning compensation amount for compensating the position control based on the operation command. On the other hand, the robots 101, 103, 104 have learned the learning compensation amount for compensating the position control based on the operation command. The robots 101, 103, 104 associate the learning compensation amount that has learned, and the operation command as learning data, and transmit the learning data to the server device 200 via the network 5.

The server device 200 is, for example, a cloud server, and includes a storage device 210. The storage device 210 stores: learning data 1 (operation command 1 and learning compensation amount 1) received from the learned robot 101; learning data 3 (operation command 3 and learning compensation amount 3) received from the learned robot 103; and learning data 4 (operation command 4 and learning compensation amount 4) received from the learned robot 104. The storage device 210 is, for example, a rewritable memory such as a hard disk drive (HDD), or a solid state drive (SDD).

Figure 2:
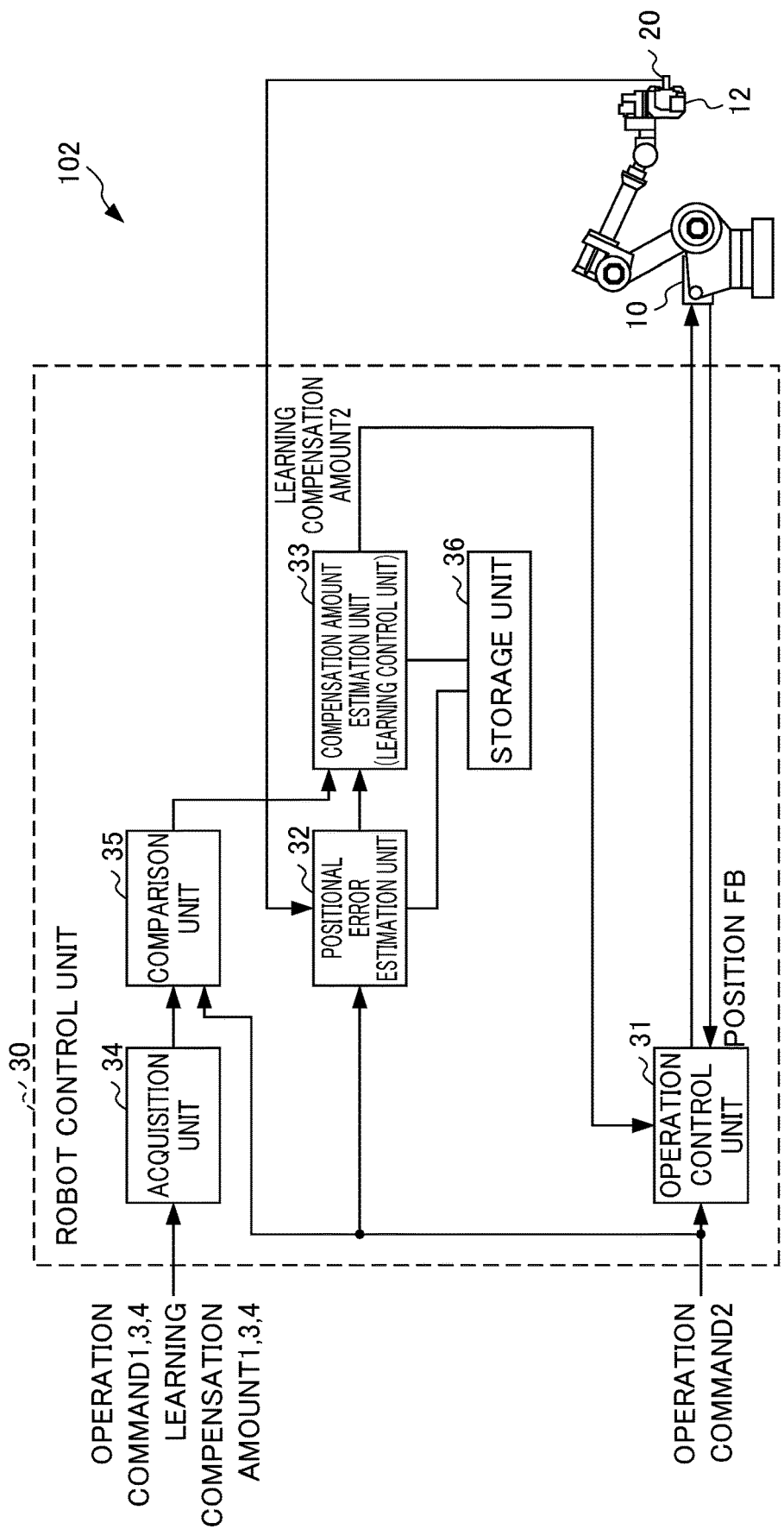
FIG. 2 is a diagram illustrating a configuration of a robot in the robot system of FIG. 1.

Next, a configuration of the robot 102 will be described in detail below. FIG. 2 is a diagram illustrating the configuration of the robot 102. The robot 102 includes a robot mechanism unit 10, a sensor 20, and a robot control unit 30.

As the robot mechanism unit 10, a known robot manipulator can be used. FIG. 2 illustrates a manipulator having six joint axes as an example of the robot mechanism unit 10. A tool 12 is provided in a tip end portion of the robot mechanism unit 10. In this robot mechanism unit 10, the tip end portion of the tool 12 is a target portion of the position control.

The sensor 20 is provided in the tip end portion of the tool 12 of the robot mechanism unit 10. The sensor 20 provides position information related to a position of the tip end portion of the tool 12 of the robot mechanism unit 10, to the robot control unit 30. Examples of the sensor 20 include a vision sensor, an acceleration sensor, a gyroscope sensor, an inertial sensor, and a strain gauge.

The robot control unit 30 controls the operation of the robot mechanism 10. The robot control unit 30 includes an operation control unit 31, a positional error estimation unit 32, a compensation amount estimation unit 33, an acquisition unit 34, a comparison unit 35, and a storage unit 36. The operation control unit 31, the positional error estimation unit 32, and the compensation amount estimation unit 33 independently provide conventional learning control of calculating the learning compensation amount with which the vibration of the tip end portion of the tool 12 is reduced, based on the position information of the tip end portion of the tool 12 of the robot mechanism unit 10 from the sensor 20. The acquisition unit 34, the comparison unit 35, and the compensation amount estimation unit 33 provide new learning control of estimating the learning compensation amount with which the vibration of the tip end portion of the tool 12 is reduced, by utilizing the learning data (operation command and learning compensation amount) of the learned robot stored in the storage device 210 of the server device 200.

The operation control unit 31 acquires a position command of a motor (not illustrated) of the robot mechanism unit 10 based on the operation command 2 of the robot mechanism unit 10, the position command related to a target position of the tip end portion (target portion of position control) of the tool 12 of the robot mechanism unit 10, for example, from a numerical control device (not illustrated). The operation control unit 31 acquires position feedback (position FB) corresponding to a position (rotation position) of the motor, from an encoder (not illustrated) attached to the motor of the robot mechanism unit 10. The operation control unit 31 acquires the learning compensation amount 2 of the tip end portion of the tool 12 of the robot mechanism unit 10, from the compensation amount estimation unit 33. The operation control unit 31 generates a drive current of the motor of the robot mechanism unit 10 based on positional error between the position command based on the acquired operation command 2 and the position feedback, and the learning compensation amount 2, and performs the position control of the tip end portion of the tool 12 of the robot mechanism unit 10.

The positional error estimation unit 32 acquires the position command based on the operation command 2 for each control period, during operation of the robot mechanism unit 10 based on the operation command 2, and once stores the position command in the storage unit 36. The positional error estimation unit 32 acquires the position information of the tip end portion of the tool 12 of the robot mechanism unit 10 from the sensor 20, during the operation of the robot mechanism unit 10 based on the operation command 2, and once stores the position information in the storage unit 36. The positional error estimation unit 32 estimates the positional error of the position of the tip end portion of the tool 12 with respect to the position command (that is, a target position of the tip end portion of the tool 12 of the robot mechanism unit 10), for each control period. This positional error includes positional error due to the vibration of the tip end portion of the tool 12 of the robot mechanism unit 10.

The compensation amount estimation unit 33 functions as a typical learning control unit, and generates the learning compensation amount for each control period, based on the positional error estimated by the positional error estimation unit 32, to store the learning compensation amount in the storage unit 36. When the learning compensation amount generated in a previous time is applied to the operation control unit 31, and learning control of repeating the operation of the robot mechanism unit 10 based on the operation command 2 is performed, the compensation amount estimation unit 33 performs learning of calculating the learning compensation amount with which the positional error estimated by the positional error estimation unit 32 is further reduced, based on the learning compensation amount generated this time and the learning compensation amount generated in the previous time, to update the learning compensation amount 2 stored in the storage unit 36.

The acquisition unit 34 is composed of a communication interface circuit. The acquisition unit 34 acquires the learning data 1 (operation command 1 and learning compensation amount 1), the learning data 3 (operation command 3 and learning compensation amount 3), and the learning data 4 (operation command 4 and learning compensation amount 4) of the learned robots 101, 103, 104, via the network 5 from the storage device 210 of the server device 200.

The comparison unit 35 compares the operation command 2 of the own robot with each of the operation command 1, the operation command 3, and the operation command 4 of the learned robots 101, 103, 104 acquired by the acquisition unit 34. In this comparison, the comparison unit 35 determines whether the same operation command as the operation command 2 of the own robot exists in the operation command 1, the operation command 2, and the operation command 3.

When all of the operation command 1, the operation command 2, and the operation command 3 are not the same as the operation command 2 of the own robot, the comparison unit 35 determines whether correlation of the operation command 2 of the own robot with each of the operation command 1, the operation command 2, and the operation command 3 is a threshold or more. For example, the comparison unit 35 scales (decreases or increases) the operation command 2 of the own robot and the operation command 1, the operation command 3, and the operation command 4 into the same time length, and determines whether correlation of the operation command 2 of the own robot that has been scaled, with each of the operation command 1, the operation command 3, and the operation command 4 that has been scaled is a threshold or more. Details of the comparison unit 35 will be described later. The correlation is a value indicating the degree of similarity, is represented by, for example, any value of 0 to 1, and is higher as being closer to 1. The similarity of the operation commands is determined by the extent of difference of start points of the operation commands, correlation of the operation commands that has been scaled into the same time length, or the like.

The compensation amount estimation unit 33 estimates the learning compensation amount 2 of the own robot based on an operation command having the highest correlation (degree of similarity) with respect to the operation command 2 of the own robot as a result of comparison by the comparison unit 35, and based on the learning compensation amount corresponding to this operation command. Hereinafter, description will be made with assumption that the operation command having the highest correlation (degree of similarity) with respect to the operation command 2 of the own robot, and the learning compensation amount corresponding to this operation command are the operation command 3 and the learning compensation amount 3.

(1) When the operation command 2 and the operation command 3 are the same (When the correlation is 1) As a result of comparison by the comparison unit 35, when the operation command 2 of the own robot and the operation command 3 of the learned robot 103 are the same, the compensation amount estimation unit 33 estimates the learning compensation amount 3 corresponding to the operation command 3 as it is as the learning compensation amount 2 of the own robot, and stores the learning compensation amount 2 in the storage unit 36.

(2) When the correlation of the operation command 2 and the operation command 3 are a threshold or more (When the correlation is close to 1)

When the correlation of the operation command 2 of the own robot and the operation command 3 of the learned robot 103 is less than 1 and is the threshold or more, as a result of the comparison by the comparison unit 35, the compensation amount estimation unit 33 compensates the learning compensation amount 3 based on a difference (a ratio of degrees and a ratio of time lengths) of the operation command 2 and the operation command 3, estimates the learning compensation amount 3 that has been compensated, as the learning compensation amount 2 of the own robot, and stores the learning compensation amount 2 in the storage unit 36. For example, the compensation amount estimation unit 33 scales the operation command 2 and the operation command 3, and the learning compensation amount 3 into the same time length, compensates the degree of the learning compensation amount 3 that has been scaled, based on the ratio of the degrees of the operation command 2 that has been scaled, and the operation command 3 that has been scaled, and scales the learning compensation amount 3 that has been compensated, into the time length of the operation command 2. Details of the compensation amount estimation unit 33 will be described later.

The robot 102 may set the learning compensation amount 2 estimated by the compensation amount estimation unit 33, as it is as the learning compensation amount, and further, may apply this learning compensation amount 2 as an initial value to perform conventional learning control of calculating the learning compensation amount with which the vibration of the tip end portion of the tool 12 of the robot mechanism unit 10 is further reduced, by the operation control unit 31, the positional error estimation unit 32, and the compensation amount estimation unit 33 as described above.

When the correlation of the operation command 2 of the own robot and the operation command 3 of the learned robot 103 is less than the threshold as a result of the comparison by the comparison unit 35, the compensation amount estimation unit 33 performs the conventional learning control based on the positional error estimated by the positional error estimation unit 32 as described above.

The compensation amount estimation unit 33 supplies the learning compensation amount stored in the storage unit 36 in the operation control unit 31, in operation based on the actual operation command 2.

The storage unit 36 stores the learning compensation amount estimated by the compensation amount estimation unit 33. The storage unit 36 is a rewritable memory such as an EEPROM.

The operation control unit 31, the positional error estimation unit 32, the compensation amount estimation unit 33, and the comparison unit 35 in the robot control unit 30 described above are composed of an operation processor such as a digital signal processor (DSP), a field-programmable gate array (FPGA), or the like. Various functions of the robot control unit 30 are realized, for example, by executing predetermined software (program or application) stored in the storage unit. Various functions of the robot control unit 30 may be realized by cooperation of hardware and software, or may be realized only by hardware (an electronic circuit).

Figure 3:
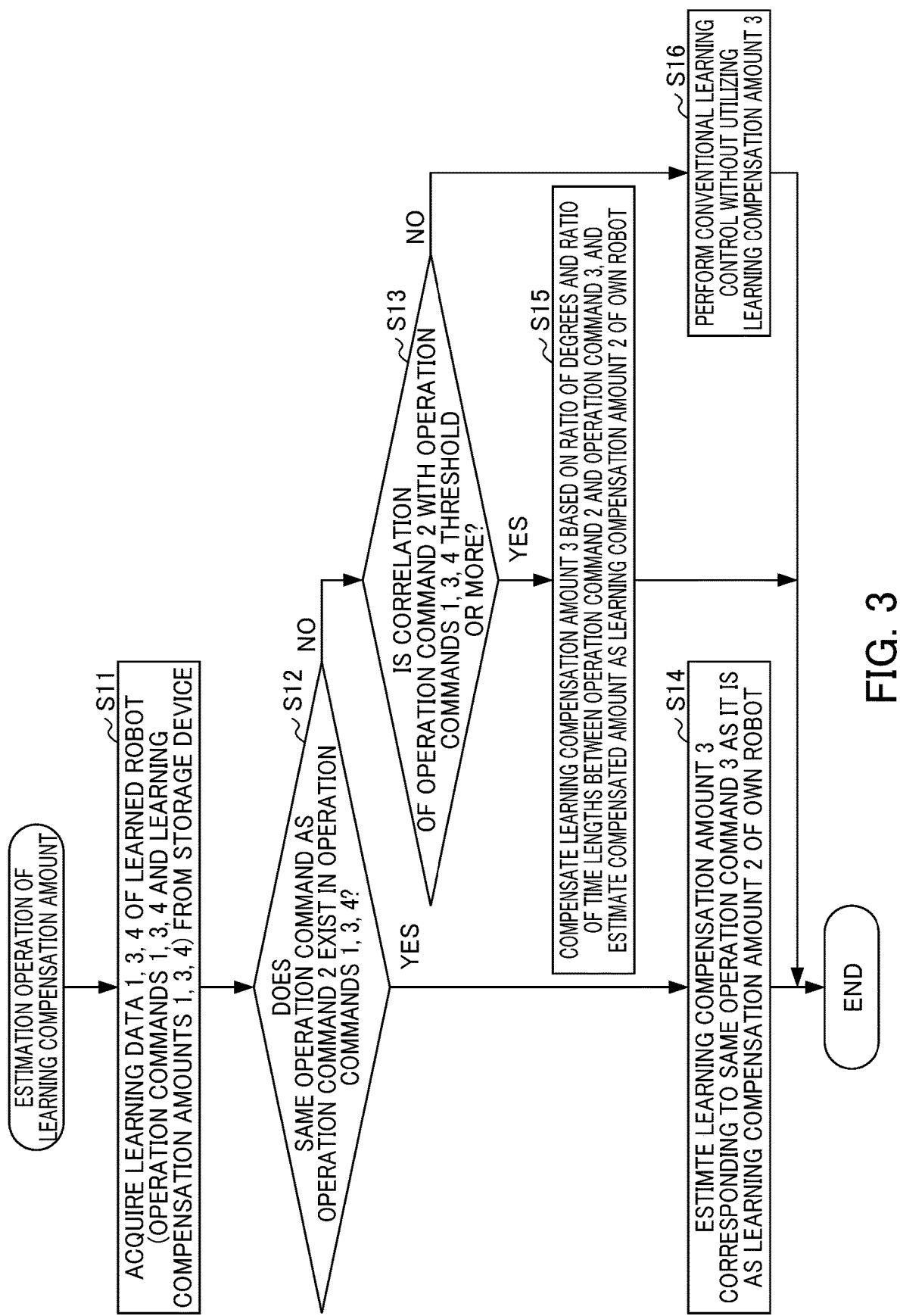
FIG. 3 is a flowchart illustrating estimation operation of a learning compensation amount by a robot control unit of a non-learned robot in a robot system of a first embodiment.
Figure 4:
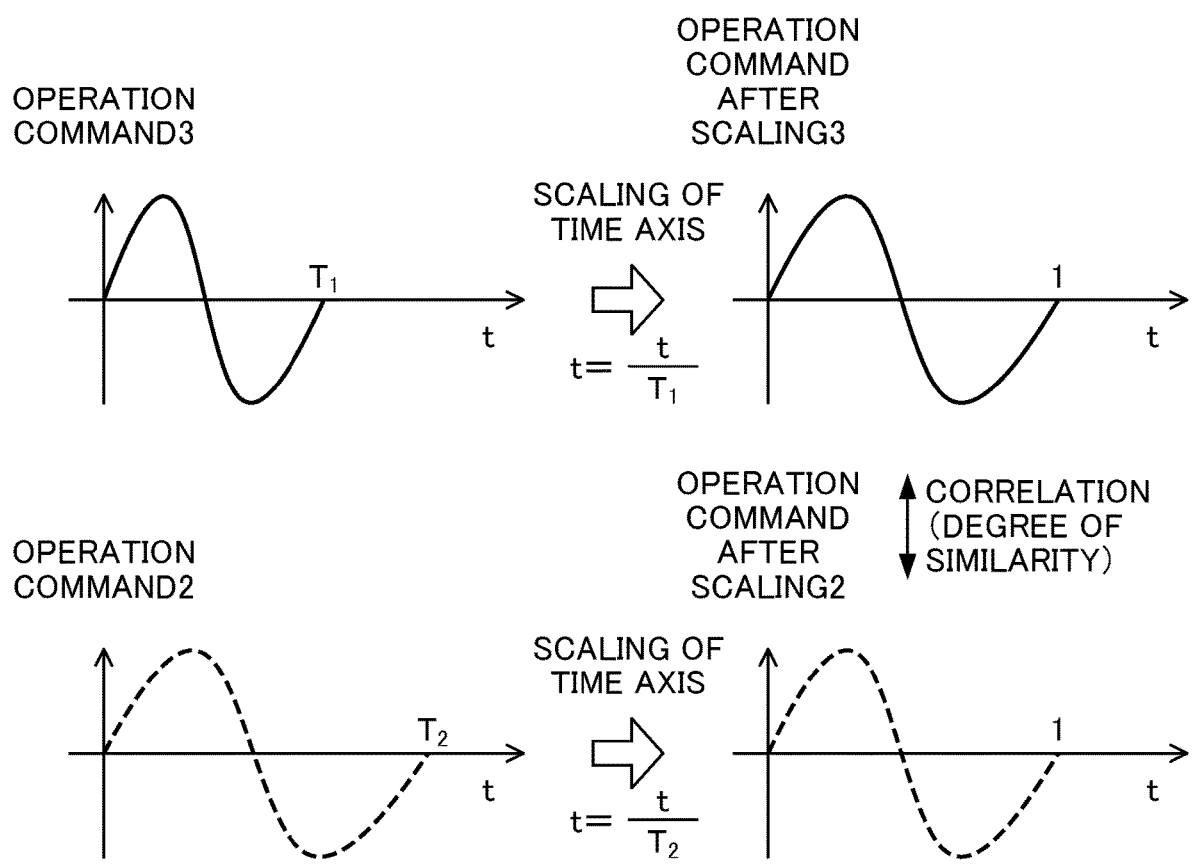
FIG. 4 is a diagram for explaining scaling of a time length of an operation command by a comparison unit in the robot control unit of the robot of FIG. 2.
Figure 5A:
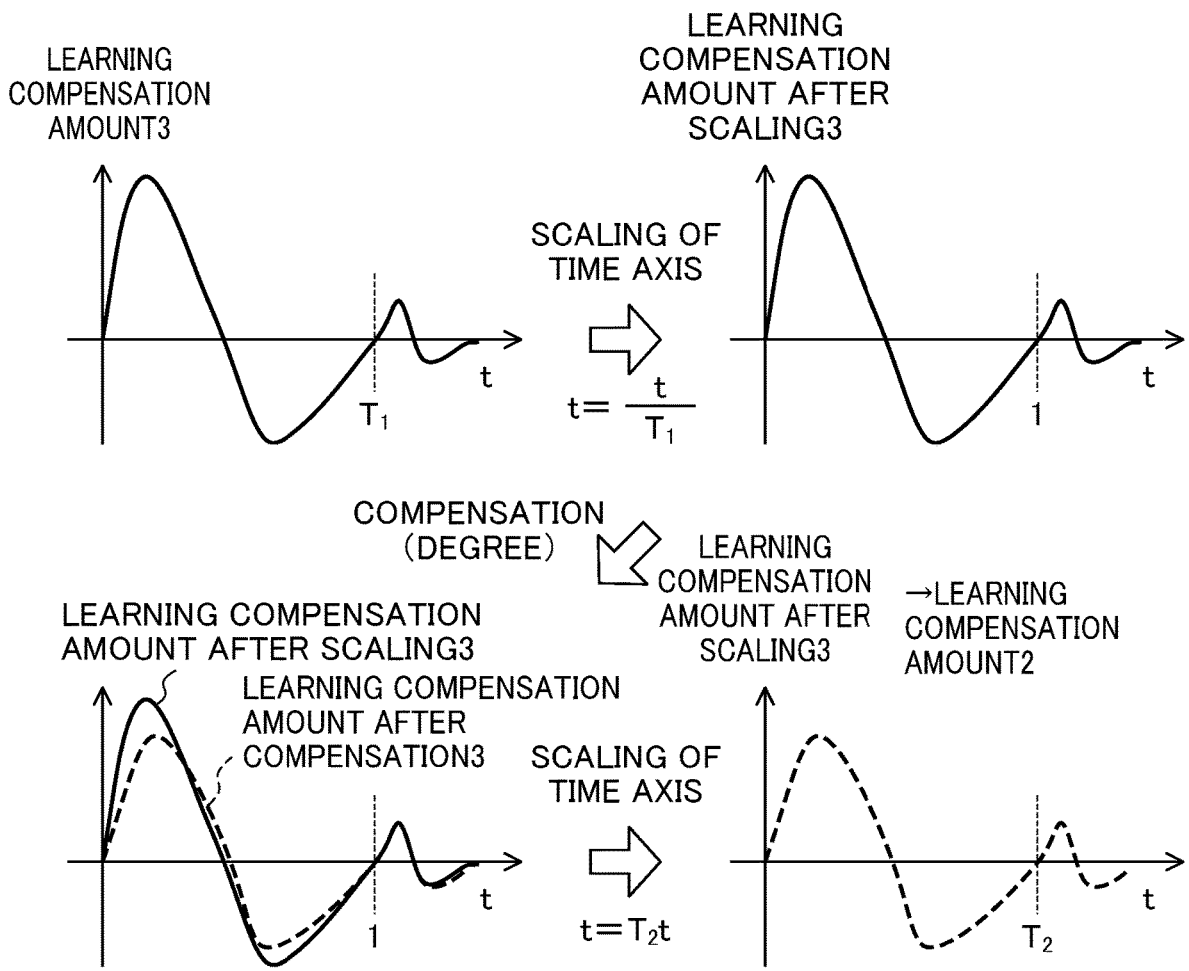
FIG. 5A is a diagram for explaining an example of estimation of the learning compensation amount by a compensation amount estimation unit in the robot control unit of the robot of FIG. 2.
Figure 5B:
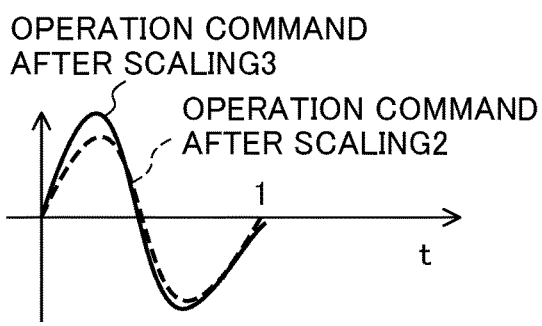
FIG. 5B is a diagram for explaining an example of a ratio of degrees of the operation commands by the compensation amount estimation unit in the robot control unit of the robot of FIG. 2.

Next, the estimation operation of the learning compensation amount by the robot control unit 30 of the non-learned robot 102 in the robot system 1 of the first embodiment will be described with reference to FIG. 3 to FIG. 5B. FIG. 3 is a flowchart illustrating the estimation operation of the learning compensation amount by the robot control unit 30 of the non-learned robot 102 in the robot system 1 of the first embodiment. FIG. 4 is a diagram for explaining scaling of time lengths of the operation command 2 and the operation command 3 by the comparison unit 35 in the robot control unit 30 of the robot 102. FIG. 5A is a diagram for explaining an example of estimation of the learning compensation amount by the compensation amount estimation unit 33 in the robot control unit 30 of the robot 102. FIG. 5B is a diagram for explaining an example of a ratio of degrees of the operation command 2 and the operation command 3 by the compensation amount estimation unit 33 in the robot control unit 30 of the robot 102.

First, the robots 101, 103, 104 have learned the learning compensation amount for compensating the position control based on the operation command, and these pieces of learning data (operation command and learning compensation amount) are stored in the storage device 210 of the server device 200. For example, the robot 101 independently performs conventional learning control of calculating the learning compensation amount 1 with which the vibration of the tip end portion of the tool 12 is reduced, based on the position information of the tip end portion of the tool 12 of the robot mechanism unit 10 from the sensor 20, by the operation control unit 31, the positional error estimation unit 32, and the compensation amount estimation unit 33. Specifically, the robot 101 applies the learning compensation amount generated in the previous time and performs the learning control of repeating the operation of the robot mechanism unit 10 based on the operation command 1, to perform the learning of calculating the learning compensation amount 1 with which the vibration of the tip end portion of the tool 12 is reduced. The robot 101 associates the learning compensation amount 1 that has been learned and the operation command 1 as the learning data 1, and transmits the learning data 1 to the server device 200 via the network 5. Similarly, the robot 103 associates the learning compensation amount 3 that has been learned by the conventional learning control by the operation control unit 31, the positional error estimation unit 32, and the compensation amount estimation unit 33, and the operation command 3 as the learning data 3, and transmits the learning data 3 to the server device 200 via the network 5. Similarly, the robot 104 associates the learning compensation amount 4 that has been learned by the conventional learning control by the operation control unit 31, the positional error estimation unit 32, and the compensation amount estimation unit 33, and the operation command 4, as the learning data 4, and transmits the learning data 4 to the server device 200 via the network 5. The server device 200 stores the learning data 1 (operation command 1 and learning compensation amount 1) received from the learned robot 101, the learning data 3 (operation command 3 and learning compensation amount 3) received from the learned robot 103, and the learning data 4 (operation command 4 and learning compensation amount 4) received from the learned robot 104, in the storage device 210.

Next, in the non-learned robot 102, the acquisition unit 34 acquires the learning data 1 (operation command 1 and learning compensation amount 1), the learning data 3 (operation command 3 and learning compensation amount 3), and the learning data 4 (operation command 4 and learning compensation amount 4) of the learned robots 101, 103, 104 from the storage device 210 of the server device 200 via the network 5 (S11).

Next, the comparison unit 35 compares the operation command 2 of the own robot, with each of the operation command 1, the operation command 2, and the operation command 3 of the learned robots 101, 103, 104 acquired by the acquisition unit 34. In this comparison, the comparison unit 35 determines whether the same operation command as the operation command 2 of the own robot exists in the operation command 1, the operation command 2, and the operation command 3 (S12). When the same operation command 3 as the operation command 2 of the own robot exists in the operation command 1, the operation command 2, and the operation command 3, the process proceeds to step S14 described later.

On the other hand, when all of the operation command 1, the operation command 2, and the operation command 3 are not the same as the operation command 2 of the own robot, the comparison unit 35 determines whether correlation (degree of similarity) of the operation command 2 of the own robot with each of the operation command 1, the operation command 2, and the operation command 3 is a threshold or more (S13). For example, as illustrated in FIG. 4, the comparison unit 35 scales the operation command 3 of a time length T1 into a time length 1 (t=t/T1), and scales the operation command 2 of a time length T2 into the time length 1 (t=t/T2). The comparison unit 35 determines correlation (degree of similarity) between the operation command 3 after the scaling and the operation command 2 after the scaling. When the determined correlation is less than 1 and is a threshold or more, the process proceeds to step S15 described later. On the other hand, the determined correlation is less than the threshold, the process proceeds to step S16 described later.

(1) When the Operation Command 2 and the Operation Command 3 are the Same (when the Correlation is 1)

In step S12, when the operation command 2 of the own robot and the operation command 3 of the learned robot 103 are the same as a result of the comparison by the comparison unit 35, the compensation amount estimation unit 33 estimates the learning compensation amount 3 corresponding to the operation command 3 as it is as the learning compensation amount 2 of the own robot, and stores the learning compensation amount 2 in the storage unit 36 (S14). Thereby, in the operation according to the actual operation command 2, the operation control unit 31 can apply the learning compensation amount 2 estimated by the compensation amount estimation unit 33 as it is, to reduce the vibration of the tip end portion of the tool 12 of the robot mechanism unit 10.

(2) When the Correlation Between the Operation Command 2 and the Operation Command 3 is the Threshold or More (when the Correlation is Close to 1)

For example, it is assumed that the operation command 3 of the learned robot 103 is an operation command of accelerating to the maximum speed by 1 second, moving at the maximum speed for 3 seconds, and then decelerating for 1 second to stop, and the operation command 2 of the non-learned robot 102 is an operation command of accelerating to the maximum speed by 1 second, moving at the maximum speed for 1 second, and then decelerating for 1 second to stop. In this case, since the operation time of the operation command 3 and the operation time of the operation command 2 are different, the learning compensation amount 3 of the learned robot 103 cannot be applied as it is as the learning compensation amount 2 of the non-learned robot 102. However, since the operation command 3 and the operation command 2 are similar, it is considered that the learning compensation amounts for each operation are similar. Thus, in step S13, when the correlation between the operation command 2 of the own robot and the operation command 3 of the learned robot 103 is less than 1 and is the threshold or more as a result of the comparison by the comparison unit 35, the compensation amount estimation unit 33 compensates the learning compensation amount 3 based on the difference (ratio of degrees and ratio of time lengths) between the operation command 2 and the operation command 3, estimates the compensated learning compensation amount 3 as the learning compensation amount 2 of the own robot, and stores the learning compensation amount 2 in the storage unit 36 (S15).

For example, as illustrated in FIG. 5A, the compensation amount estimation unit 33 scales the learning compensation amount 3 of the time length T1 into the time length 1 (t=t/T1). As illustrated in FIG. 4, the compensation amount estimation unit 33 scales the operation command 3 of the time length T1 into the time length 1 (t=t/T1), and scales the operation command 2 of the time length T2 into the time length 1 (t=t/T2). Next, as illustrated in FIG. 5B, the compensation amount estimation unit 33 determines a ratio of degrees of the operation command 2 after the scaling and the operation command 3 after the scaling, with a predetermined time interval. Next, as illustrated in FIG. 5A, the compensation amount estimation unit 33 compensates the degree of the learning compensation amount 3 after the scaling based on the ratio of the degrees between the operation command 2 after the scaling and the operation command 3 after the scaling, with the predetermined time interval. Next, the compensation amount estimation unit 33 scales the compensated learning compensation amount 3 into the time length T2 (t=T2t) of the operation command 2 of the own robot, and estimates the scaled amount as the learning compensation amount 2 of the own robot. The compensation amount estimation unit 33 performs scaling of t=t/T1*T2t=T2/T1 by two-time scaling of time length, thereby compensating the learning compensation amount 3 based on the ratio of time lengths of the operation command 2 and the operation command 3.

Thereby, in the operation according to the actual operation command 2, the operation control unit 31 can apply the learning compensation amount 2 estimated by the compensation amount estimation unit 33 as it is, to reduce the vibration of the tip end portion of the tool 12 of the robot mechanism unit 10. Otherwise, the learning compensation amount 2 estimated by the compensation amount estimation unit 33 may be applied as an initial value, learning control of repeating operation of the robot mechanism unit 10 based on the operation command 2 may be performed by the operation control unit 31, the positional error estimation unit 32, and the compensation amount estimation unit 33, and learning of calculating the learning compensation amount of further reducing the vibration of the tip end portion of the tool 12. Thereby, in the operation according to the actual operation command 2, the operation control unit 31 can apply the learning compensation amount 2 learned by the compensation amount estimation unit 33 to further reduce the vibration of the tip end portion of the tool 12 of the robot mechanism 10.

(3) When the Correlation Between the Operation Command 2 and the Operation Command 3 is Less than the Threshold On the other hand, in step S13, when the correlation between the operation command 2 of the own robot and the operation command 3 of the learned robot 103 is less than the threshold as a result of the comparison by the comparison unit 35, a conventional learning control of calculating the learning compensation amount 2 with which the vibration of the tip end portion of the tool 12 is reduced is performed based on the position information of the tip end portion of the tool 12 of the robot mechanism unit 10 from the sensor 20, by the operation control unit 31, the positional error estimation unit 32, and the compensation amount estimation unit 33, independently without utilizing the learning compensation amount 3 of the learned robot 103. Specifically, the robot 102 applies the learning compensation amount generated in a previous time to perform the learning control of repeating the operation of the robot mechanism unit 10 based on the operation command 2, thereby performing learning of calculating the learning compensation amount 2 with which the vibration of the tip end portion of the tool 12 is reduced (S16). Thereby, in the operation according to the actual operation command 2, the operation control unit 31 can apply the learning compensation amount 2 that has been learned by the compensation amount estimation unit 33, to reduce the vibration of the tip end portion of the tool 12 of the robot mechanism unit 10.

As described above, according to the robot system 1 of the present embodiment, the learned robots 101, 103, 104 store the learning data 1 (operation command 1 and learning compensation amount 1), the learning data 3 (operation command 3 and learning compensation amount 3) and the learning data 4 (operation command 4 and learning compensation amount 4) in the storage device 210 of the server device 200. These learned robots 101, 103, 104, and non-learned robot 102 share these pieces of learning data (operation commands and learning compensation amounts) stored in the storage device 210 of the server device 200. The compensation amount estimation unit 33 in the non-learned robot 102 compensates the learning compensation amount 3 corresponding to the operation command 3 having the highest correlation (degree of similarity) with the operation command 2 of the own robot among the operation commands 1, 3, 4 stored in the storage device 210, for example, based on the difference (ratio of degrees and ratio of time lengths) between the operation command 3 and the operation command 2 of the own robot, and estimates the compensated learning compensation amount 3 as the learning compensation amount 2 of the own robot. Thereby, the number of learning times of the non-learned robot 102 can be reduced. The total number of learning times of the robots 101, 102, 103, 104 in the robot system 1 can be reduced. When a plurality of robots performing the same operation exist, only one of them may perform learning and the other robots need not perform the learning. Thus, the total number of learning times can be greatly reduced.

Second Embodiment

In the robot system 1 of the first embodiment, the non-learned robot 102 compensates the learning compensation amount 3 of the learned robot 103 based on the difference (ratio of degrees and ratio of time lengths) between the operation command 2 of the own robot and the operation command 3 of the learned robot 103, and estimates the compensated amount as the learning compensation amount 2 of the own robot. In the robot system 1 according to a second embodiment, the non-learned robot 102 compensates the learning compensation amount of the learned robot 103 based on a transfer function from the operation command 3 of the learned robot 103 to the operation command 2 of the own robot, and estimates the compensated amount as the learning compensation amount 2 of the own robot.

A configuration of the robot system 1 according to the second embodiment is the same as the configuration of the robot system 1 of the first embodiment illustrated in FIG. 1. A configuration of the robot 102 (and 101, 103, 104) according to the second embodiment is the same as the configuration of the robot 102 (and 101, 103, 104) of the first embodiment illustrated in FIG. 2. In the robot 102 (and 101, 103, 104) according to the second embodiment, the function and operation of the compensation amount estimation unit 33 are different from those of the robot 102 (and 101, 103, 104) of the first embodiment.

(1) When the Operation Command 2 and the Operation Command 3 are the Same (when the Correlation is 1)

When the operation command 2 of the own robot and the operation command 3 of the learned robot 103 are the same as a result of the comparison by the comparison unit 35, the compensation amount estimation unit 33 estimates the learning compensation amount 3 corresponding to the operation command 3 as it is as the learning compensation amount 2 of the own robot, and stores the learning compensation amount 2 in the storage unit 36, as described above.

(2) When Correlation Between the Operation Command 2 and the Operation Command 3 is the Threshold or More (when the Correlation is Close to 1)

When the correlation between the operation command 2 of the own robot and the operation command 3 of the learned robot 103 is less than 1 and is the threshold or more as a result of the comparison by the comparison unit 35, the compensation amount estimation unit 33 compensates the learning compensation amount 3 based on the transfer function from the operation command 3 to the operation command 2, estimates the compensated learning compensation amount 3 as the learning compensation amount 2 of the own robot, and stores the learning compensation amount 2 in the storage unit 36. For example, the compensation amount estimation unit 33 determines the transfer function from the operation command 3 to the operation command 2, applies the determined transfer function to the learning compensation amount 3, and compensates the learning compensation amount 3.

Figure 6:
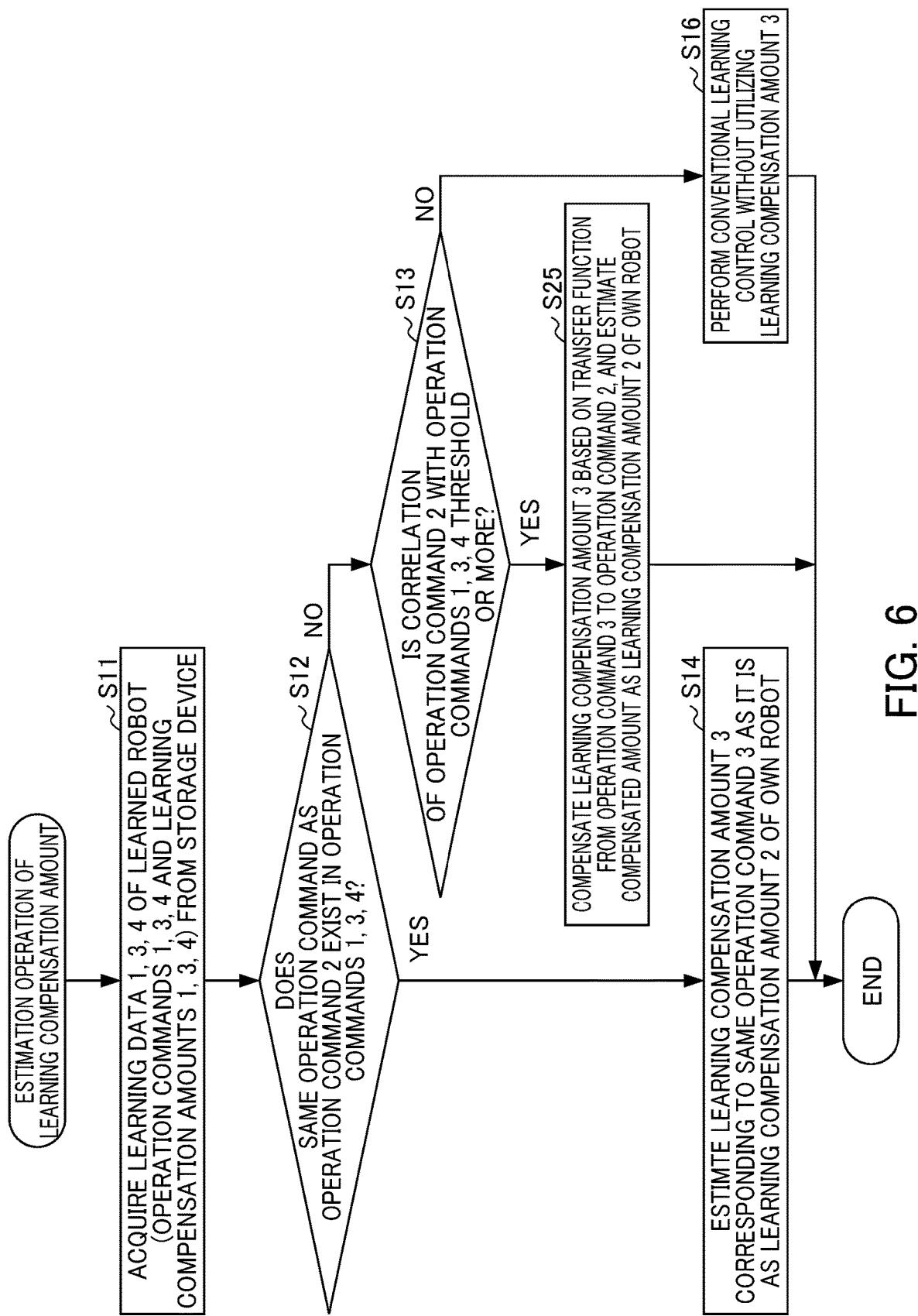
FIG. 6 is a flowchart illustrating estimation operation of a learning compensation amount by a robot control unit of a non-learned robot in a robot system of a second embodiment.
Figure 7A:
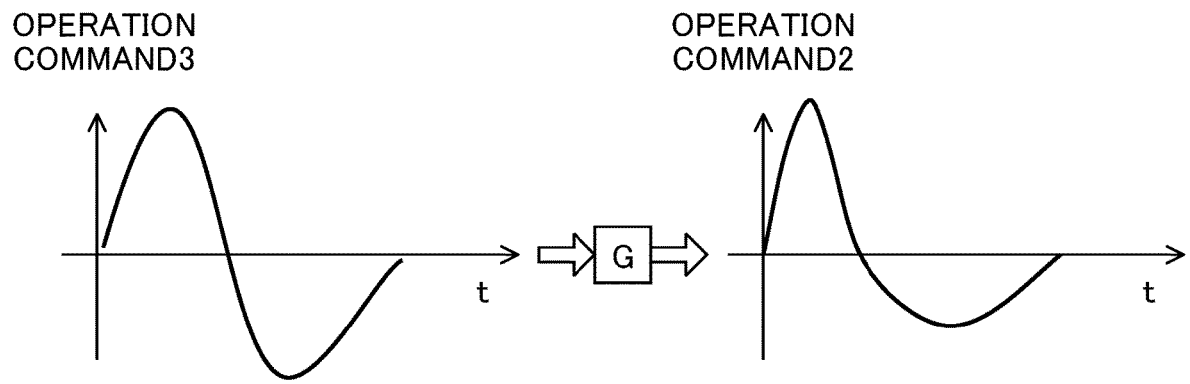
FIG. 7A is a diagram for explaining an example of a way to determine a transfer function of the operation command by the compensation amount estimation unit in the robot control unit of the robot of FIG. 2.
Figure 7B:
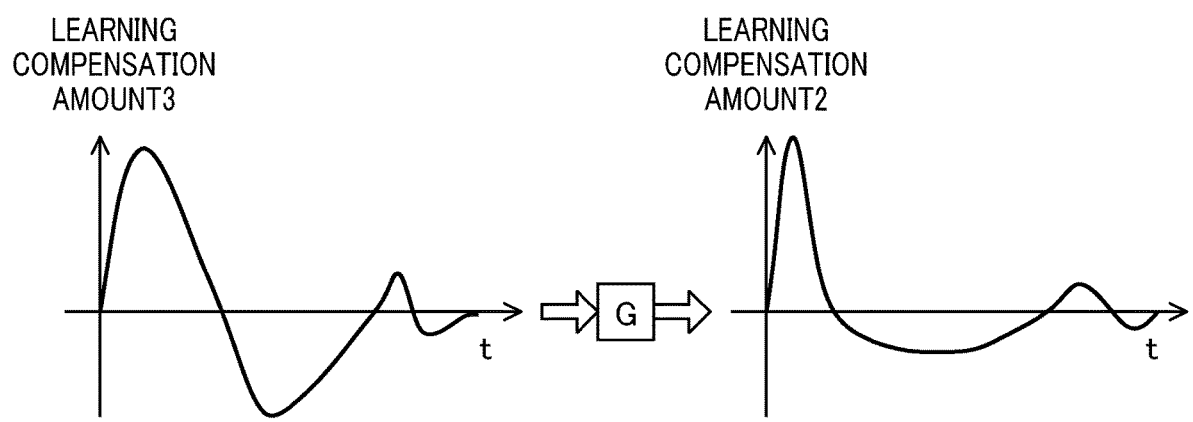
FIG. 7B is a diagram for explaining another example of the estimation of the learning compensation amount by the compensation amount estimation unit in the robot control unit of the robot of FIG. 2.

Next, the estimation operation of the learning compensation amount by the non-learned robot 102 in the robot system 1 of the second embodiment will be described with reference to FIG. 6 to FIG. 7B. FIG. 6 is a flowchart illustrating the estimation operation of the learning compensation amount by the non-learned robot 102 in the robot system 1 of the second embodiment. FIG. 7A is a diagram for explaining an example of a way to determine the transfer function from the operation command 3 to the operation command 2 by the compensation amount estimation unit 33 in the robot control unit 30 of the robot 102. FIG. 7B is a diagram for explaining an example of estimation of the learning compensation amount by the compensation amount estimation unit 33 in the robot control unit 30 of the robot 102.

As illustrated in FIG. 6, the operation of steps S11 to S13 described above are performed, and the comparison unit 35 compares the operation command 2 of the own robot with each of the operation command 1, the operation command 2, and the operation command 3 of the learned robots 101, 103, 104 stored in the storage device 210 of the server device 200.

(1) When the Operation Command 2 and the Operation Command 3 are the Same (when the Correlation is 1)

In step S12, when the operation command 2 of the own robot and the operation command 3 of the learned robot 103 are the same as a result of the comparison by the comparison unit 35, the operation of step S14 described above is performed, and the compensation amount estimation unit 33 estimates the learning compensation amount 3 corresponding to the operation command 3 as it is as the learning compensation amount 2 of the own robot, and stores the learning compensation amount 2 in the storage unit 36 (S14).

(2) When the Correlation Between the Operation Command 2 and the Operation Command 3 is the Threshold or More (the Correlation is Close to 1)

In step S13, when the correlation between the operation command 2 of the own robot and the operation command 3 of the learned robot 103 is less than 1 and is the threshold or more as a result of the comparison by the comparison unit 35, the compensation amount estimation unit 33 compensates the learning compensation amount 3 based on the transfer function from the operation command 3 to the operation command 2, estimates the compensated learning compensation amount 3 as the learning compensation amount 2, and stores the learning compensation amount 2 in the storage unit 36 (S25). For example, as illustrated in FIG. 7A, the compensation amount estimation unit 33 determines a transfer function G from the operation command 3 to the operation command 2. Next, as illustrated in FIG. 7B, the compensation amount estimation unit 33 applies the determined transfer function G to the learning compensation amount 3 to compensate the learning compensation amount 3, and estimates the compensated amount as the learning compensation amount 2 of the own robot.

(3) When the Correlation Between the Operation Command 2 and the Operation Command 3 is Less than the Threshold On the other hand, in step S13, when the correlation between the operation command 2 of the own robot and the operation command 3 of the learned robot 103 is less than the threshold as a result of the comparison by the comparison unit 35, the operation of step S16 described above is performed, and the conventional learning control is performed by the operation control unit 31, the positional error estimation unit 32, and the compensation amount estimation unit 33 (S16).

In this robot system 1 of the second embodiment, similar advantages to the robot system 1 of the first embodiment can be obtained.

The embodiments of the present invention have been described above. However, the present invention is not limited to the aforementioned embodiments. Effects described in the embodiments are only listed for the most suitable effects generated from the present invention. Effects by the present invention is not limited to those described in the embodiments.

For example, the embodiments described above may be changed as appropriate, or may be combined to be performed. For example, when the first embodiment and the second embodiment are combined, and the correlation (degree of similarity) between the operation command of the own robot and the operation command of the learned robot is a first threshold or more, the learning compensation amount of the learned robot may be compensated based on the difference (ratio of degrees and ratio of time lengths) between the operation command of the own robot and the operation command of the learned robot, so that the learning compensation amount of the own robot is estimated, as similar to the first embodiment. When the correlation is less than the first threshold and is a second threshold or more (first threshold>second threshold), the learning compensation amount of the learned robot may be performed based on the transfer function from the operation command of the learned robot to the operation command of the own robot, so that the learning compensation amount of the own robot is estimated, as similar to the second embodiment.

In the second embodiment described above, the transfer function from the operation command of the learned robot to the operation command of the own robot is exemplified. However, the function is not limited to the transfer function, and various functions may be applied.

In the embodiments described above, the learned robot stores the learning data (operation command and learning compensation amount) in the storage device of the server device via the network, and the learning data is shared among the plurality of robots. However, storing the learning data is not limited to this. For example, the learned robot may store the learning data (operation command and learning compensation amount) in the storage unit of the own robot, and the learning data may be shared among a plurality of robots connected via a network. Otherwise, the learning data may be stored in the storage unit of a master robot in a plurality of robots, and may be shared among the plurality of robots.

In the embodiments described above, a robot system including four robots is exemplified. However, the present invention can be applied to a robot system including an at least one non-learned robot, and at least one learned robot.

In the embodiments described above, an industrial robot is exemplified as a robot. However, the robot is not limited to this. The characteristics of the present invention can be applied to reduction of the number of learning times of various robots that perform learning control.

EXPLANATION OF REFERENCE NUMERALS

1 Robot system
5 Network
10 Robot mechanism unit
12 Tool
20 Sensor
30 Robot control unit
31 Operation control unit
32 Positional error estimation unit
33 compensation amount estimation unit (learning control unit)
34 Acquisition unit
35 Comparison unit
36 Storage unit
101, 102, 103, 104 Robot
200 Server device (Cloud)
210 Storage device

What is claimed is:

1. A robot system comprising:
at least one non-learned robot that has not learned a learning compensation amount of position control based on an operation command;
at least one learned robot that has learned the learning compensation amount of the position control based on the operation command; and
a storage device that stores the operation command and the learning compensation amount of the learned robot,
wherein the non-learned robot comprising a compensation amount estimation unit that compensates the learning compensation amount of the learned robot stored in the storage device based on a difference between the operation command of the learned robot stored in the storage device and an operation command of an own robot, and estimates the learning compensation amount that has been compensated, as a learning compensation amount of the own robot.

2. The robot system according to claim 1, wherein the compensation amount estimation unit compensates the learning compensation amount of the learned robot based on a ratio of degrees and a ratio of time lengths between the operation command of the learned robot and the operation command of the own robot.

3. The robot system according to claim 2, wherein the compensation amount estimation unit scales the operation command and the learning compensation amount of the learned robot and the operation command of the own robot into the same time length, compensates the degree of the learning compensation amount of the learned robot that has been scaled, based on a ratio of degrees of the operation command of the learned robot that has been scaled and the operation command of the own robot that has been scaled, and scales the learning compensation amount of the learned robot that has been compensated into a time length of the operation command of the own robot, thereby compensating the learning compensation amount of the learned robot.

4. The robot system according to claim 1, wherein the compensation amount estimation unit compensates the learning compensation amount of the learned robot based on a function from the operation command of the learned robot to the operation command of the own robot.

5. The robot system according to claim 4, wherein the compensation amount estimation unit determines a transfer function from the operation command of the learned robot to the operation command of the own robot, and compensates the learning compensation amount of the learned robot by applying the determined transfer function to the learning compensation amount of the learned robot.

6. The robot system according to claim 1, wherein the non-learned robot further comprises a comparison unit that compares the operation command of the learned robot stored in the storage device and the operation command of the own robot, and the compensation amount estimation unit compensates the learning compensation amount of the learned robot when correlation of the operation command of the learned robot and the operation command of the own robot is a threshold or more as a result of comparison by the comparison unit, and estimates the learning compensation amount that has been compensated, to be the learning compensation amount of the own robot.

7. The robot system according to claim 6, wherein the comparison unit scales the operation command of the learned robot and the operation command of the own robot into the same time length, and compares the operation command of the learned robot that has been scaled, and the operation command of the own robot that has been scaled.

8. The robot system according to claim 6, wherein the compensation amount estimation unit estimates the learning compensation amount of the learned robot as it is as the learning compensation amount of the own robot, when the operation command of the learned robot and the operation command of the own robot are the same as a result of comparison by the comparison unit.

9. The robot system according to claim 1, wherein the robot system further comprises a server device connected to the non-learned robot and the learned robot via a network, and comprising the storage device.

* * * * *